US011064032B1

(12) United States Patent
Yang et al.

(10) Patent No.: US 11,064,032 B1
(45) Date of Patent: Jul. 13, 2021

(54) APPLICATION-AWARE ROUTING IN NETWORK ADDRESS TRANSLATION ENVIRONMENTS

(71) Applicant: Trend Micro Incorporated, Tokyo (JP)

(72) Inventors: Guangxiang Yang, Nanjing (CN); Zhichao Ding, Nanjing (CN); Yun Zhong, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 16/930,646

(22) Filed: Jul. 16, 2020

(51) Int. Cl.
| | |
|---|---|
| *G06F 15/16* | (2006.01) |
| *H04L 29/08* | (2006.01) |
| *H04L 12/28* | (2006.01) |
| *H04L 29/06* | (2006.01) |
| *H04L 12/741* | (2013.01) |
| *H04L 29/12* | (2006.01) |

(52) U.S. Cl.
CPC ............ *H04L 67/141* (2013.01); *H04L 12/28* (2013.01); *H04L 45/74* (2013.01); *H04L 61/2007* (2013.01); *H04L 61/2038* (2013.01); *H04L 61/256* (2013.01); *H04L 63/0236* (2013.01); *H04L 63/166* (2013.01); *H04L 67/10* (2013.01); *H04L 69/22* (2013.01); *H04L 69/326* (2013.01)

(58) Field of Classification Search
None
See application file for complete search history.

(56) References Cited

U.S. PATENT DOCUMENTS

| | | | | |
|---|---|---|---|---|
| 7,287,090 B1 * | 10/2007 | Berg | ................... | H04L 67/1008 709/219 |
| 8,804,512 B1 * | 8/2014 | Helmy | .................. | H04L 65/105 370/230 |
| 10,498,652 B2 * | 12/2019 | Mayya | .................. | H04L 43/028 |

(Continued)

FOREIGN PATENT DOCUMENTS

WO       WO-2006012610 A2 *   2/2006    .........  H04L 47/2433

OTHER PUBLICATIONS

Miercom—Trend Micro Cloud Edge 100G2/50/SB, Competitive UTM Assessment, Nov. 2019, 24 pages.

(Continued)

*Primary Examiner* — Phyllis A Book
(74) *Attorney, Agent, or Firm* — Okamoto & Benedicto LLP

(57) ABSTRACT

A network device has a Local Area Network (LAN) port and several Wide Area Network (WAN) ports. The network device detects a computing device that is connected to the LAN port initiating establishment of a TCP connection. The network device creates a TCP socket that establishes the TCP connection with the computing device and inspects TCP packets on the TCP connection to identify a cloud application associated with the TCP packets. The network device creates another TCP socket that establishes a TCP connection to the identified cloud application by way of a WAN port that is designated to be an output port for the identified cloud application. A routing path is created between the LAN port and the designated WAN port. Subsequent TCP packets originated by the computing device for the identified cloud application are forwarded along the routing path.

20 Claims, 6 Drawing Sheets

(56) References Cited

U.S. PATENT DOCUMENTS

| | | | | |
|---|---|---|---|---|
| 2002/0112087 A1* | 8/2002 | Berg | ............ | H04L 67/142 |
| | | | | 719/313 |
| 2014/0153574 A1* | 6/2014 | Louzoun | ............ | H04L 1/188 |
| | | | | 370/392 |
| 2019/0319873 A1* | 10/2019 | Shelar | ............ | H04L 45/22 |
| 2019/0394136 A1* | 12/2019 | Ho | ............ | H04L 67/42 |

OTHER PUBLICATIONS

Wikipedia—Deep packet inspection, 15 pages (retrieved on Jul. 13, 2020), retrieved from the internet: https://en.wikipedia.org/wiki/Deep_packet_inspection.

* cited by examiner

US 11,064,032 B1

APPLICATION-AWARE ROUTING IN NETWORK ADDRESS TRANSLATION ENVIRONMENTS

BACKGROUND OF THE INVENTION

1. Field of the Invention

The present invention relates generally to computer networks, and more particularly but not exclusively to application-aware routing.

2. Description of the Background Art

A router is a network device that forwards data packets between computer networks. For example, a router may be employed to forward data between a computing device on a Local Area Network (LAN) and another computing device on a Wide Area Network (WAN). A router may operate in Network Address Translation (NAT) mode to hide the Internet Protocol (IP) addresses of computing devices on the LAN. In NAT mode, during communication with computing devices on the WAN, the router uses the same IP address for multiple computing devices on the LAN. The router performs network address translation to ensure that data packets coming from the WAN side are forwarded to the correct computing devices on the LAN side.

Software-defined Wide Area Network (SD-WAN) is a virtual WAN architecture that allows client applications hosted by computing devices on private computer networks to exchange information with cloud applications, i.e., applications that are hosted in the cloud. A network device that is compatible with SD-WAN may need to route data packets by application-aware routing. That is, data packets coming from the LAN side may need to be routed to a cloud application on the WAN side based on the identity of the cloud application. Generally, application-aware routing involves inspecting data packets, e.g., by deep packet inspection, to identify the cloud application associated with the data packets and then routing the data packets to the identified cloud application.

Embodiments of the present invention provide application-aware routing capability to network devices that operate in NAT mode.

SUMMARY

In one embodiment, a network device has a Local Area Network (LAN) port and a plurality of Wide Area Network (WAN) ports. The network device detects a computing device that is connected to the LAN port initiating establishment of a TCP connection. The network device creates a TCP socket that establishes the TCP connection with the computing device and inspects TCP packets on the TCP connection to identify a cloud application associated with the TCP packets. The network device creates another TCP socket that establishes a TCP connection to the identified cloud application by way of a WAN port that is designated to be an output port for the identified cloud application. A routing path is created between the LAN port and the designated WAN port. Subsequent TCP packets originated by the computing device for the identified cloud application are forwarded along the routing path.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
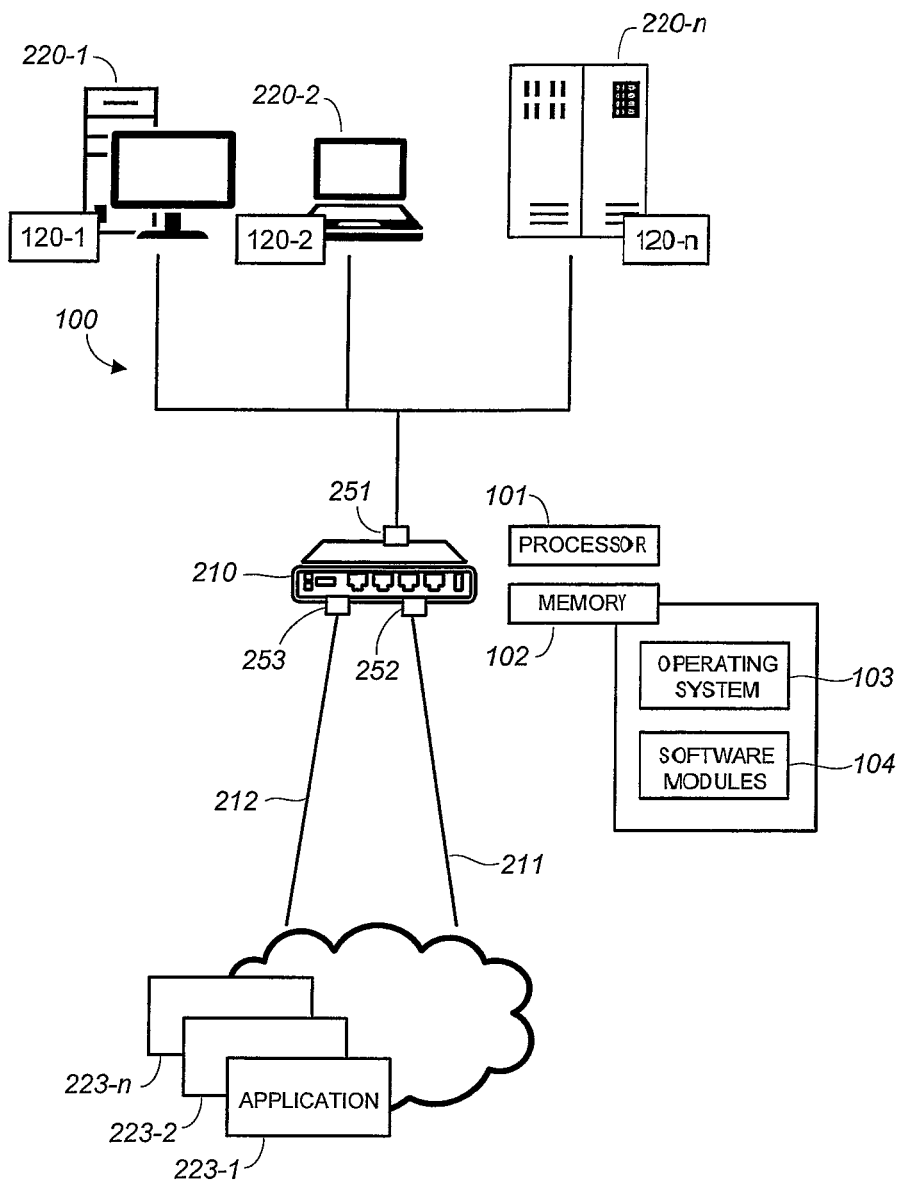
FIG. 1 shows a logical diagram of a system for performing application-aware routing in accordance with an embodiment of the present invention.

FIG. 1 shows a logical diagram of a system for performing application-aware routing in accordance with an embodiment of the present invention. The system of FIG. 1 may include a plurality of computing devices 220 (i.e., 220-1, 220-2, . . . , 220-n) that are connected to a LAN 100 of a private computer network. A computing device 220 may be a desktop computer, laptop computer, server computer, or other computing device. A computing device 220 may be hosting an application 120 (i.e., 120-1, 120-2, . . . , 120-n) that communicates with a cloud application 223 (i.e., 223-1, 223-2, . . . , 223-n). A cloud application 223 may be hosted on one or more computing devices that are external to the private computer network, such as on one or more computing devices that are part of a cloud computing platform. For example, a cloud application 223 may be hosted on the Amazon Web Service (AWS)™ cloud computing platform. As can be appreciated, embodiments of the present invention are equally applicable to applications other than cloud applications.

A network device 210, which belongs to the private computer network, may be deployed at the edge of the private computer network. The network device 210 may comprise a processor 101 and a memory 102. The memory 102 stores instructions that when executed by the processor 101 cause the network device 210 to perform the functionality of the network device 210. In the example of FIG. 1, the memory 102 stores an operating system 103, which in one embodiment is the LINUX™ or other UNIX™-like operating system. The memory 102 also stores one or more software modules 104, which define the functionalities of the network device 210. As can be appreciated, the functionalities of the network device 210 may be implemented in software, hardware (e.g., field programmable gate array (FPGA), programmable logic), or combination of hardware and software.

In the example of FIG. 1, the network device 210 functions as an SD-WAN-compatible router with NAT enabled. The network device 210 includes a LAN port 251 that connects to the LAN 100. The network device 210 further includes a WAN port 252 and a WAN port 253 for connecting to destinations that are outside the private computer network. The network device 210 may have more LAN and WAN ports. Other computing devices and network components are not shown in FIG. 1 for clarity of illustration.

The computing devices 220 are referred to as being on the LAN side, whereas destinations that are connected to the WAN ports 252 and 253 are referred to as being on the WAN side. In one embodiment, the network device 210 operates in NAT mode. That is, the network device 210 uses the same IP address for a plurality of computing devices on the LAN side to communicate with computing devices on the WAN side.

The network device 210 performs network address translation to map connections between the computing devices on the LAN side and computing devices on the WAN side.

In NAT mode, i.e., operating as a router with NAT enabled, the network device 210 may forward a data packet received on the LAN port 251 to either the WAN port 252 or the WAN port 253 depending on the cloud application 223 associated with the data packet, i.e., the cloud application 223 for which the data packet is intended. The network device 210 may route the data packet from the LAN port 251 to the WAN port 252 to transmit the data packet over a network path 211. The network device 210 may route the data packet from the LAN port 251 to the WAN port 253 to transmit the data packet over a network path 212.

Figure 2:
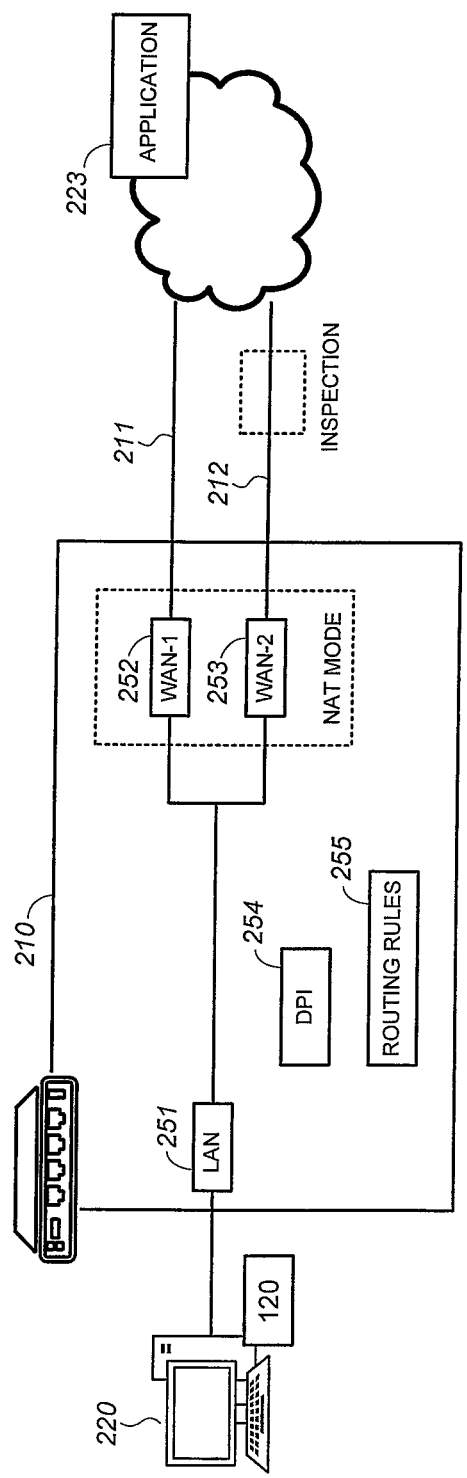
FIG. 2 shows a logical diagram of a network device in accordance with an embodiment of the present invention.

FIG. 2 shows a logical diagram of the network device 210 in accordance with an embodiment of the present invention. In one embodiment, the network device 210 forwards data packets from a computing device on the LAN side to a destination on the WAN side by application-aware routing. The network device 210 may determine that a data packet is for a destination on the WAN side (as opposed to a destination on the LAN side) based on a destination Internet Protocol (IP) address of the data packet.

In the example of FIG. 2, a client application 120 running on a computing device 220 works in conjunction with a cloud application 223 that is hosted in the cloud. The network device 210 is configured to route data packets of a communication session between the client application 120 and the cloud application 223 based on the identity of the cloud application 223. The network device 210 includes a deep packet inspection (DPI) module 254, which may employ a conventional DPI algorithm to inspect one or more data packets of the communication session to detect the identity of the cloud application 223.

In the example of FIG. 2, the computing device 220 on the LAN side is connected to the LAN port 251 of the network device 210. In one embodiment, the network device 210 is configured to route Transport Control Protocol (TCP) packets from the LAN port 251 to either the WAN port 252 ("WAN-1") or the WAN port 253 ("WAN-2") depending on one or more predetermined routing rules 255 for the cloud application 223 that is associated with the TCP packets. As previously noted, the network device 210 operates in NAT mode.

A routing rule 255 may indicate routing TCP packets that are associated with a cloud application 223 to a particular WAN port for load balancing, latency reduction, cybersecurity inspection, or other reasons. For example, a routing rule 255 may indicate routing TCP packets associated with a Voice over IP (VoIP) application over the network path 212, in which case the network device 210 is to route the TCP packets from the LAN port 251 to the WAN port 253, so that the TCP packets may be inspected for cybersecurity reasons (e.g., antivirus scanning, policy enforcement, data leakage prevention, intrusion prevention). As another example, a routing rule 255 may dictate forwarding TCP packets associated with a database application over a network path 211 for load balancing, in which case the network device 210 is to route the TCP packets from the LAN port 251 to the WAN port 252.

Figure 3:
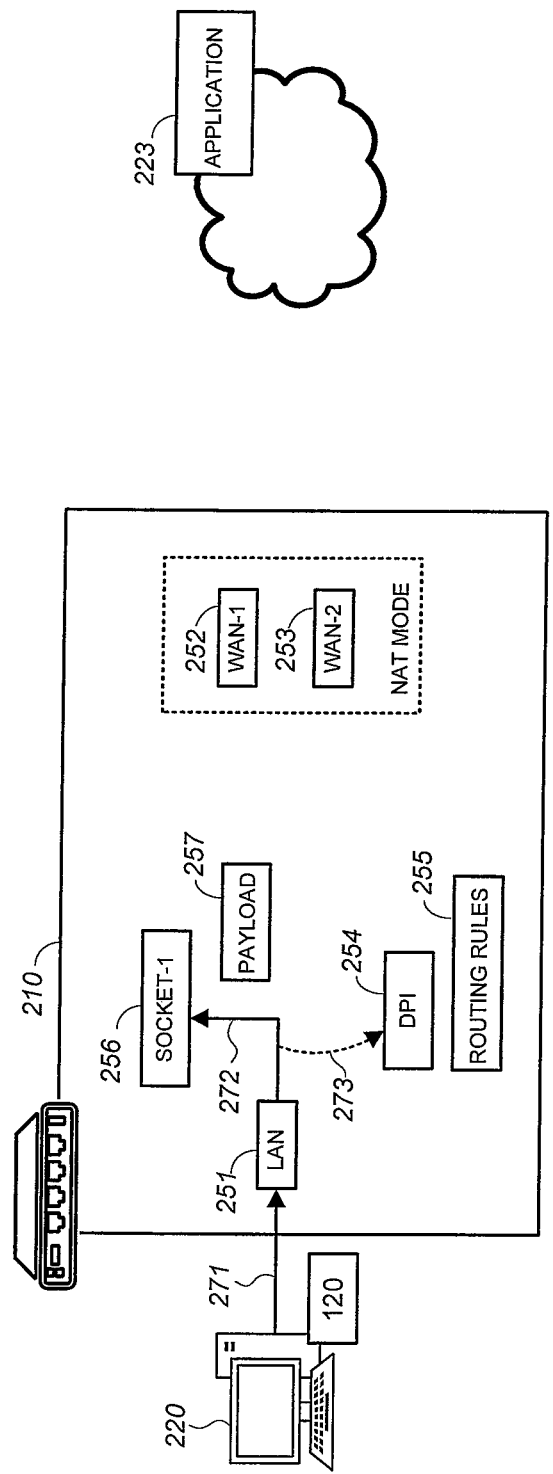
FIGS. 3-5 show logical diagrams that illustrate a method of application-aware routing by a network device in accordance with an embodiment of the present invention.
Figure 4:
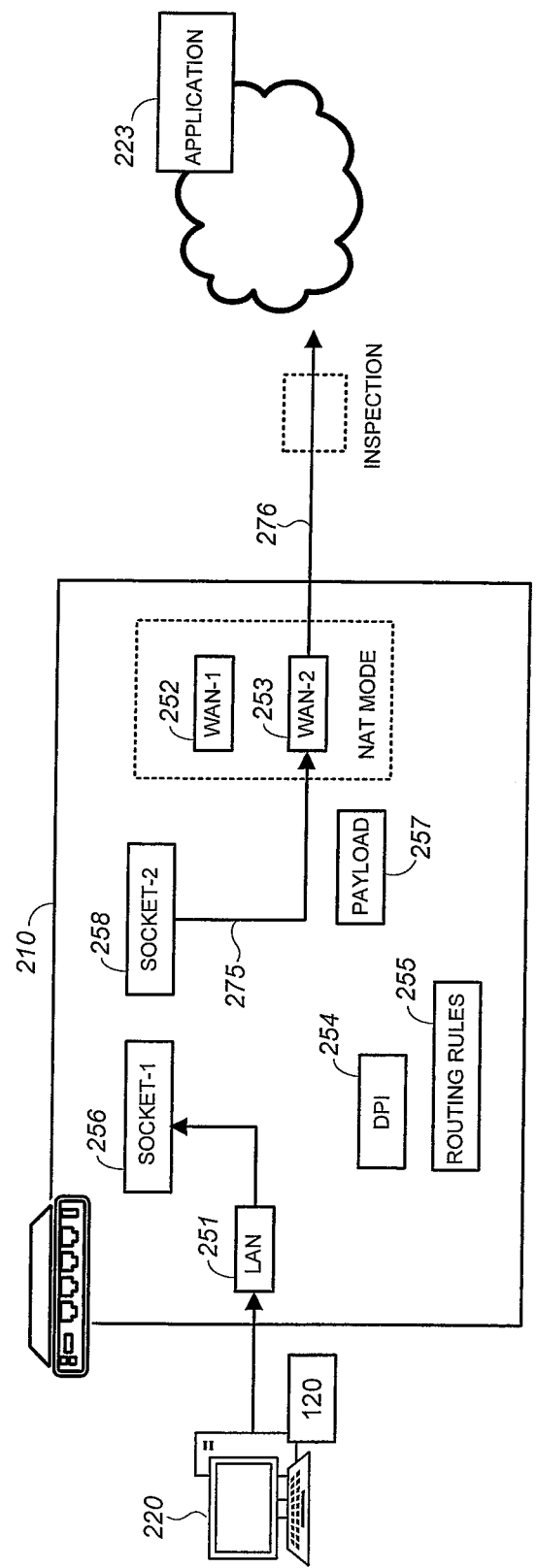
Figure 5:
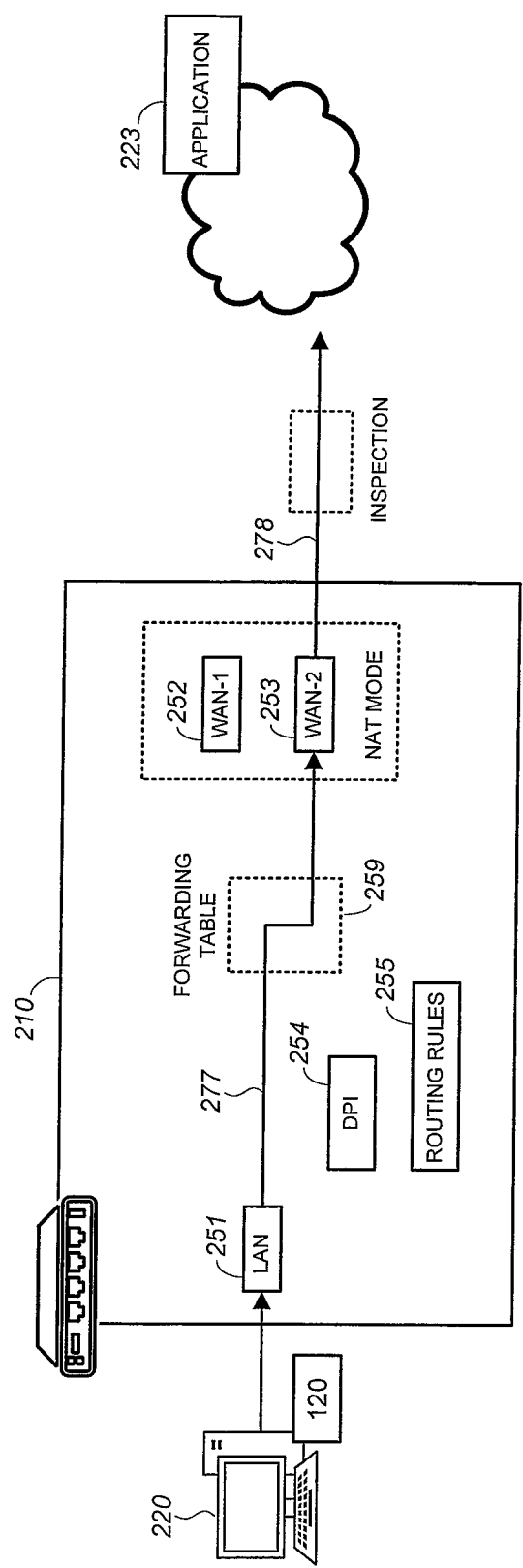

FIGS. 3-5 show logical diagrams that illustrate a method of application-aware routing by the network device 210 in accordance with an embodiment of the present invention.

Referring first to FIG. 3, the client application 120 hosted by the computing device 220 is going to have a communication session with the cloud application 223. Accordingly, the computing device 220, which is connected to the LAN port 251, initiates establishment of a TCP connection to the cloud application 223 (see arrow 271). The establishment of the TCP connection may be in accordance with the TCP three-way handshake procedure. In a nutshell, in the TCP three-way handshake procedure, a client device (computing device 220 in this case) sends a SYN packet to initiate establishing a TCP connection with a server device (computing device that hosts the cloud application 223 in this case). In response to the SYN packet from the client device, the server device sends a SYN/ACK packet to the client device. In response to the SYN/ACK packet from the server device, the client device sends an ACK packet to the server device to establish the TCP connection.

The DPI module 254 typically needs to inspect more TCP packets than those transmitted during the three-way handshake procedure to identify the cloud application 223 that is associated with the TCP packets. The DPI module 254 may need to receive an additional packet, such as a payload packet, to identify the associated cloud application 223. This poses a problem because the network device 210 needs to route the handshake packets to one of the WAN ports to complete the TCP three-way handshake procedure in the first place. However, the network device 210 cannot tell which of the WAN ports is the designated WAN port for the TCP packets without knowing the identity of the cloud application 223. For example, the network device 210 may route the TCP packets to the WAN port 252 to complete the TCP three-way handshake procedure, only to subsequently discover that the TCP packets are associated with a cloud application 223 that requires routing the TCP packets to the WAN port 253. At that point, it would be too late to switch routing of the TCP packets from the WAN port 252 to the WAN port 253.

In one embodiment, the network device 210 creates a first TCP socket 256 in response to receiving a TCP packet (e.g., SYN packet) that initiates establishment of a TCP connection between a computing device on the LAN side and a destination on the WAN side. Generally, a TCP socket is a virtual port that serves as a single endpoint for a TCP connection. In the example of FIG. 3, the TCP socket 256 is configured to hijack the TCP connection being established by the computing device 220. The TCP socket 256 is configured to perform the TCP three-way handshake procedure with the computing device 220 to establish the TCP connection (see arrow 272).

The DPI module 254 monitors and inspects the TCP packets on the TCP connection between the computing device 220 and the TCP socket 256 (see arrow 273). At some point after the TCP connection is established, the computing device 220 will transmit a payload packet 257 over the TCP connection. The payload packet 257 includes information being communicated by the client application 120 to the cloud application 223. The DPI module 254 inspects the payload packet 257 to determine the identity of the associated cloud application 223.

Continuing in FIG. 4, once the associated cloud application 223 has been identified, the network device 210 looks for one or more routing rules 255 that apply to the cloud application 223. In the example of FIG. 4, a routing rule 255 indicates routing TCP packets for the cloud application 223 to the WAN port 253. Accordingly, the network device 210 creates a second TCP socket 258 that establishes a TCP connection to the cloud application 223 by way of the WAN port 253 (see arrows 275 and 276). The TCP socket 258 forwards the payload packet 257 to the cloud application 223 over the TCP connection through the WAN port 253.

Continuing in FIG. 5, the network device 210 deletes the TCP sockets 256 and 258 (for improved performance), and begins forwarding TCP packets for the communication session between the application 120 and the cloud application 223 along an internal routing path that connects the LAN port 251 to the WAN port 253 (see arrow 277). In one embodiment, the routing path between the LAN port 251 and the WAN port 253 is formed by creating corresponding connection tracking data stored in an internal forwarding table 259, e.g., using the conntrack feature of the LINUX kernel networking stack.

Figure 6:
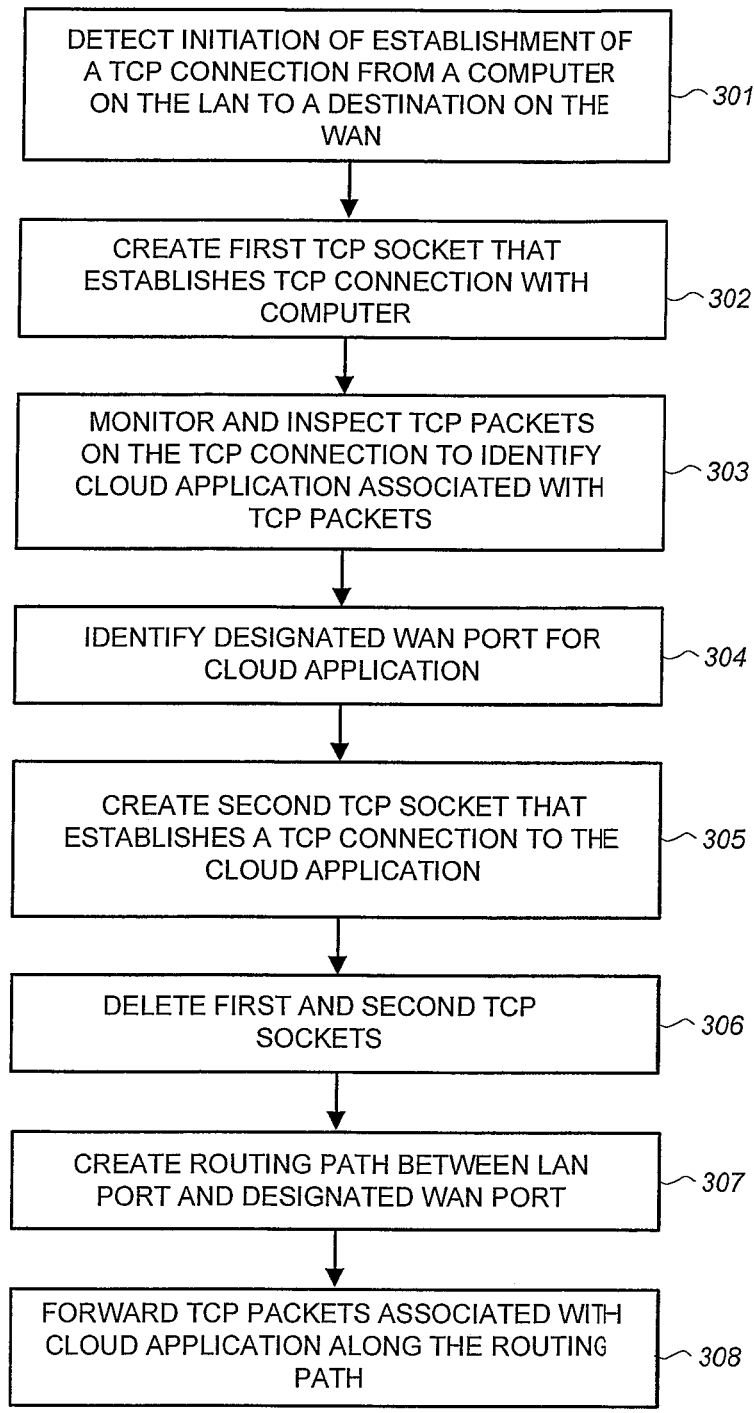
FIG. 6 shows a flow diagram of a method of performing application-aware routing in accordance with an embodiment of the present invention.

FIG. 6 shows a flow diagram of a method of performing application-aware routing in accordance with an embodiment of the present invention. The method of FIG. 6 may be performed by the network device 210. As can be appreciated, other components may also be employed without detracting from the merits of the present invention.

The network device 210 detects initiation of establishment of a TCP connection from a computing device that hosts a client application on the LAN side to a destination on the WAN side (step 301). In response to detecting the initiation of establishment of the TCP connection, the network device 210 creates a first TCP socket that establishes the TCP connection with the computing device (step 302). The network device 210 monitors and inspects TCP packets on the TCP connection to identify the cloud application that is associated with the TCP packets (step 303). The network device 210 identifies, e.g., from a routing rule, a WAN port that is designated as an output port for TCP packets associated with the cloud application (step 304). The network device 210 creates a second TCP socket that establishes a TCP connection to the cloud application by way of the designated WAN port (step 305). The network device 210 deletes the first and second TCP sockets (step 306). The network device 210 creates a routing path between the LAN port and the designated WAN port (step 307), and forwards subsequent TCP packets associated with the cloud application along the routing path (step 308). That is, subsequent TCP packets for the communication session between the client application and the cloud application are routed along the routing path from the LAN port to the designated WAN port.

Network devices and methods for application-aware routing have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method to be performed by a network device that comprises a Local Area Network (LAN) port and a plurality of Wide Area Network (WAN) ports, the method comprising:

detecting initiation of establishment of a first Transport Control Protocol (TCP) connection from a first computing device that is connected to the LAN port of the network device;

establishing the first TCP connection between the first computing device and the network device, wherein the first computing device and the network device are endpoints of the first TCP connection;

inspecting a first set of TCP packets on the first TCP connection to identify a cloud application that is associated with the first set of TCP packets;

identifying a designated WAN port among the plurality of WAN ports of the network device that is designated as an output port of TCP packets associated with the cloud application;

establishing, through the designated WAN port, a second TCP connection between the network device and the cloud application, wherein the network device and the cloud application are endpoints of the second TCP connection;

creating a routing path between the LAN port and the designated WAN port internally in the network device using a conntrack feature of a LINUX kernel networking stack;

receiving, on the LAN port, a second set of TCP packets associated with the cloud application from the first computing device; and forwarding the second set of TCP packets along the routing path internally in the network device.

2. The method of claim 1, wherein establishing the first TCP connection between the first computing device and the network device comprises:

creating a first TCP socket in the network device; and
establishing the first TCP connection between the first computing device and the first TCP socket.

3. The method of claim 2, wherein establishing the second TCP connection between the network device and the second computing device comprises:

creating a second TCP socket in the network device; and
establishing the second TCP connection between the second TCP socket and the second computing device.

4. The method of claim 3, further comprising:

deleting the first and second TCP sockets.

5. The method of claim 1, wherein identifying the designated WAN port among the plurality of WAN ports of the network device comprises:

finding a routing rule that indicates routing TCP packets associated with the cloud application to the designated WAN port.

6. The method of claim 1, further comprising:

inspecting the second set of TCP packets for cybersecurity on a node that is connected to the designated WAN port.

7. The method of claim 1, wherein inspecting the first set of TCP packets on the first TCP connection to identify the cloud application comprises:

inspecting a payload packet transmitted on the first TCP connection.

8. A network device comprising:

a Local Area Network (LAN) port;
a plurality of Wide Area Network (WAN) ports;
a processor; and
a memory storing instructions that, when executed by the processor, cause the network device to:

detect initiation of establishment of a first Transport Control Protocol (TCP) connection from a computing device that is connected to the LAN port;

establish the first TCP connection between the computing device and the network device, wherein the computing device and the network device are endpoints of the first TCP connection;

inspect a first set of TCP packets on the first TCP connection to identify a cloud application that is associated with the first set of TCP packets;

identify a designated WAN port among the plurality of WAN ports that is designated as an output port of TCP packets associated with the cloud application;

establish through the designated WAN port a second TCP connection between the network device and the cloud application;

create a routing path between the LAN port and the designated WAN port internally in the network device using a conntrack feature of a LINUX kernel networking stack;

receive on the LAN port a second set of TCP packets associated with the cloud application; and forward the second set of TCP packets along the routing path internally in the network device.

9. The network device of claim 8, wherein the instructions stored in the memory, when executed by the processor, cause the network device to establish the first TCP connection by creating a first TCP socket in the network device and establishing the first TCP connection between the first computing device and the first TCP socket.

10. The network device of claim 9, wherein the instructions stored in the memory, when executed by the processor, cause the network device to establish the second TCP connection by creating a second TCP socket in the network device and establishing the second TCP connection between the second TCP socket and the second computing device.

11. The network device of claim 10, wherein the instructions stored in the memory, when executed by the processor, cause the network device to delete the first and second TCP sockets.

12. The network device of claim 8, wherein the instructions stored in the memory, when executed by the processor, cause the network device to identify the designated WAN port by finding a routing rule that indicates routing TCP packets associated with the cloud application to the designated WAN port.

13. The network device of claim 8, wherein the instructions stored in the memory, when executed by the processor, cause the network device to inspect a payload packet transmitted on the first TCP connection to identify the cloud application.

14. A method to be performed by a network device that comprises a Local Area Network (LAN) port and a plurality of Wide Area Network (WAN) ports, the method comprising:

detecting initiation of establishment of a Transport Control Protocol (TCP) connection between a first computing device that is connected to the LAN port of the network device and an application that is running on a second computing device;

before transmitting any TCP packet from the computing device to the application, identifying the application by inspecting a payload packet transmitted by the computing device to the application;

identifying a designated WAN port among the plurality of WAN ports of the network device that is designated to output TCP packets associated with the application; and after identifying the designated WAN port, forwarding subsequent TCP packets transmitted by the first computing device to the application from the LAN port of the network device to the designated WAN port internally in the network device using a conntrack feature of a LINUX kernel networking stack.

15. The method of claim 14, wherein identifying the designated WAN port among the plurality of WAN ports of the network device comprises:

finding a routing rule that indicates routing TCP packets associated with the application to the designated WAN port.

16. The method of claim 14, wherein identifying the application by inspecting the payload packet transmitted by the computing device to the application comprises:

establishing the TCP connection between the first computing device and a first TCP socket in the network device; and inspecting the payload packet transmitted by the first computing device on the TCP connection.

17. The method of claim 16, wherein forwarding the subsequent TCP packets transmitted by the first computing device to the application from the LAN port of the network device to the designated WAN port comprises:

establishing another TCP connection between a second TCP socket in the network device and the second computing device;

creating a routing path between the LAN port and the designated WAN port; and forwarding the subsequent TCP packets along the routing path internally in the network device.

18. The method of claim 17, further comprising:
deleting the first and second TCP sockets.

19. The method of claim 14, wherein the second computing device is part of a cloud computing platform and the application is a cloud application.

20. The method of claim 14, further comprising:
inspecting the subsequent TCP packets for cybersecurity at a node that is connected to the designated WAN port.

* * * * *